(12) United States Patent
Etchegoyen

(10) Patent No.: US 8,736,462 B2
(45) Date of Patent: *May 27, 2014

(54) SYSTEM AND METHOD FOR TRAFFIC INFORMATION DELIVERY

(75) Inventor: Craig Stephen Etchegoyen, Irvine, CA (US)

(73) Assignee: Uniloc Luxembourg, S.A., Luxembourg (LU)

( * ) Notice: Subject to any disclaimer, the term of this patent is extended or adjusted under 35 U.S.C. 154(b) by 842 days.

This patent is subject to a terminal disclaimer.

(21) Appl. No.: 12/813,378

(22) Filed: Jun. 10, 2010

(65) Prior Publication Data

US 2010/0321209 A1 Dec. 23, 2010

Related U.S. Application Data

(60) Provisional application No. 61/219,477, filed on Jun. 23, 2009.

(51) Int. Cl.
*G08G 1/081* (2006.01)

(52) U.S. Cl.
USPC ........... 340/910; 340/907; 340/916; 340/924; 340/993; 340/995.1; 701/117

(58) Field of Classification Search
CPC ........... G08G 1/07; G08G 1/095; G08G 1/08; G08G 1/096783; G08G 1/164; G08G 1/081; G08G 1/087; G08G 1/096716; G08G 1/20; G08G 1/205; G08G 1/0104; G01C 21/367; G01C 21/26; G01C 21/3697; G01C 21/36
USPC ......... 340/902, 907, 909, 910, 916–917, 919, 340/924, 933, 944, 990–993, 340/995.1–995.28; 701/117; 380/44, 285, 380/256
See application file for complete search history.

(56) References Cited

U.S. PATENT DOCUMENTS 4,351,982 A 9/1982 Miller et al.
4,658,093 A 4/1987 Hellman (Continued)

FOREIGN PATENT DOCUMENTS

AU 678985 6/1997
EP 1 202 494 5/2002

(Continued)

OTHER PUBLICATIONS

Wikipedia: "Software Extension," May 28, 2009, Internet Article retrieved on Oct. 11, 2010. XP002604710.

(Continued)

*Primary Examiner* — George Bugg
*Assistant Examiner* — Sharmin Akhter
(74) *Attorney, Agent, or Firm* — Sean D. Burdick

(57) ABSTRACT

A system and method for traffic information delivery may be implemented as a static network device for sharing information with network nodes. The system includes a processor in communication with a transceiver and memory, the memory containing code that when executed by the processor effects the method steps for determining an occurrence of a traffic incident within a defined distance from the device, establishing communication with a network node, receiving a device identifier over a public network from the network node, the device identifier based on a user-configurable parameter and a non-user-configurable parameter of the network node, establishing in response to the device identifier matching an authorized device identifier corresponding to a known network node, a secure private network with the network node, and sending information about the traffic incident to the network node via the secure private network.

20 Claims, 6 Drawing Sheets

(56) References Cited

U.S. PATENT DOCUMENTS

| | | | |
|---|---|---|---|
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,615,061 A | 3/1997 | Singh | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,852,724 A | 12/1998 | Glenn, II et al. | |
| 5,925,127 A | 7/1999 | Ahmad | |
| 5,974,150 A | 10/1999 | Kaish et al. | |
| 6,009,401 A | 12/1999 | Horstmann | |
| 6,044,471 A | 3/2000 | Colvin | |
| 6,158,005 A | 12/2000 | Bharathan et al. | |
| 6,173,311 B1 | 1/2001 | Hassett et al. | |
| 6,202,170 B1 | 3/2001 | Busschbach et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,463,078 B1 | 10/2002 | Engstrom et al. | |
| 6,536,005 B1 | 3/2003 | Augarten | |
| 6,785,825 B2 | 8/2004 | Colvin | |
| 6,826,690 B1 | 11/2004 | Hind et al. | |
| 6,859,793 B1 | 2/2005 | Lambiase | |
| 6,868,083 B2 | 3/2005 | Apostolopous et al. | |
| 6,920,567 B1 | 7/2005 | Doherty et al. | |
| 6,940,422 B1 | 9/2005 | Bachelder et al. | |
| 6,967,592 B2* | 11/2005 | Bell et al. | 340/905 |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,117,526 B1 | 10/2006 | Short | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,506,056 B2 | 3/2009 | Satish et al. | |
| 7,653,899 B1 | 1/2010 | Lindahl et al. | |
| 7,698,416 B2 | 4/2010 | Potti et al. | |
| 7,765,328 B2 | 7/2010 | Bryers et al. | |
| 7,836,121 B2 | 11/2010 | Elgressy et al. | |
| 7,852,861 B2 | 12/2010 | Wu et al. | |
| 7,965,843 B1* | 6/2011 | Maino et al. | 380/256 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0063750 A1 | 4/2003 | Medvinsky et al. | |
| 2003/0065918 A1 | 4/2003 | Willey | |
| 2003/0073406 A1* | 4/2003 | Benjamin et al. | 455/41 |
| 2003/0126240 A1 | 7/2003 | Vosseler | |
| 2003/0163734 A1 | 8/2003 | Yoshimura et al. | |
| 2003/0172035 A1 | 9/2003 | Cronce et al. | |
| 2003/0188001 A1 | 10/2003 | Eisenberg et al. | |
| 2003/0217289 A1 | 11/2003 | Ammon et al. | |
| 2003/0236880 A1 | 12/2003 | Srivastava et al. | |
| 2003/0237004 A1 | 12/2003 | Okamura | |
| 2004/0024860 A1 | 2/2004 | Sato et al. | |
| 2004/0030912 A1 | 2/2004 | Merkle et al. | |
| 2004/0054569 A1 | 3/2004 | Pombo et al. | |
| 2004/0059929 A1 | 3/2004 | Rodgers et al. | |
| 2004/0107360 A1 | 6/2004 | Herrmann et al. | |
| 2004/0143746 A1 | 7/2004 | Ligeti et al. | |
| 2004/0148397 A1 | 7/2004 | Aronoff et al. | |
| 2004/0187018 A1 | 9/2004 | Owen et al. | |
| 2004/0196162 A1 | 10/2004 | Brooke | |
| 2005/0033957 A1 | 2/2005 | Enokida | |
| 2005/0050531 A1 | 3/2005 | Lee | |
| 2005/0055552 A1 | 3/2005 | Shigeeda | |
| 2005/0071391 A1 | 3/2005 | Fuerderer et al. | |
| 2005/0108173 A1 | 5/2005 | Stefik et al. | |
| 2005/0138155 A1 | 6/2005 | Lewis | |
| 2005/0172161 A1 | 8/2005 | DeLaCruz et al. | |
| 2005/0172280 A1 | 8/2005 | Ziegler et al. | |
| 2005/0192832 A1 | 9/2005 | Call et al. | |
| 2005/0264431 A1 | 12/2005 | Bachelder | |
| 2006/0072444 A1 | 4/2006 | Engel et al. | |
| 2006/0095199 A1 | 5/2006 | Lagassey | |
| 2006/0095454 A1 | 5/2006 | Shankar et al. | |
| 2006/0130135 A1 | 6/2006 | Krstulich et al. | |
| 2006/0161914 A1 | 7/2006 | Morrison et al. | |
| 2006/0166656 A1 | 7/2006 | Klicpera et al. | |
| 2006/0230317 A1 | 10/2006 | Anderson | |
| 2006/0265337 A1 | 11/2006 | Wesinger, Jr. | |
| 2006/0265446 A1 | 11/2006 | Elgressy et al. | |
| 2006/0277596 A1 | 12/2006 | Calvert et al. | |
| 2006/0280207 A1 | 12/2006 | Guarini et al. | |
| 2006/0282511 A1 | 12/2006 | Takano et al. | |
| 2007/0055853 A1 | 3/2007 | Hatasaki et al. | |
| 2007/0136726 A1 | 6/2007 | Freeland et al. | |
| 2007/0143001 A1* | 6/2007 | Park et al. | 701/117 |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0282615 A1 | 12/2007 | Hamilton et al. | |
| 2008/0065552 A1 | 3/2008 | Elazar et al. | |
| 2008/0074289 A1 | 3/2008 | Sauder et al. | |
| 2008/0084877 A1 | 4/2008 | Brzozowski | |
| 2008/0086423 A1 | 4/2008 | Waites | |
| 2008/0147556 A1 | 6/2008 | Smith et al. | |
| 2008/0175235 A1 | 7/2008 | Frifeldt | |
| 2008/0228578 A1 | 9/2008 | Mashinsky | |
| 2008/0298595 A1 | 12/2008 | Narayanan et al. | |
| 2008/0320607 A1 | 12/2008 | Richardson | |
| 2009/0051568 A1 | 2/2009 | Corry et al. | |
| 2009/0059823 A1* | 3/2009 | Bolduc et al. | 370/310 |
| 2009/0083730 A1 | 3/2009 | Richardson | |
| 2009/0138975 A1 | 5/2009 | Richardson | |
| 2009/0150674 A1 | 6/2009 | Richardson et al. | |
| 2009/0158396 A1 | 6/2009 | Baum et al. | |
| 2010/0057703 A1 | 3/2010 | Brandt et al. | |
| 2010/0182918 A1 | 7/2010 | Clevy et al. | |
| 2012/0271686 A1 | 10/2012 | Silverman | |

FOREIGN PATENT DOCUMENTS

| | | |
|---|---|---|
| EP | 1637958 | 3/2006 |
| EP | 1637961 | 3/2006 |
| EP | 1670188 | 6/2006 |
| EP | 1 912 413 | 4/2008 |
| WO | WO 9220022 | 11/1992 |
| WO | WO 9301550 | 1/1993 |
| WO | WO 9535533 | 12/1995 |
| WO | WO 0067095 | 11/2000 |
| WO | WO 01/55876 | 8/2001 |
| WO | WO 2004/023620 | 3/2004 |
| WO | WO 2004/102881 | 11/2004 |
| WO | WO 2005/094544 | 10/2005 |
| WO | WO 2005104686 | 11/2005 |
| WO | WO 2006/138393 | 12/2006 |
| WO | WO2007060516 | 5/2007 |
| WO | WO 2007/022134 | 7/2007 |
| WO | WO 2008/004755 | 1/2008 |
| WO | WO2008013504 | 1/2008 |
| WO | WO 2008/118074 | 10/2008 |

(56) References Cited

FOREIGN PATENT DOCUMENTS

| WO | WO2008157639 | 12/2008 |
|----|---|---|
| WO | WO 2009/009866 | 1/2009 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |

OTHER PUBLICATIONS

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Williams, R., "A Painless Guide to CRC Error Detection Algorithms", Ver. 3, Aug. 19, 1993.

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Marin et al., "Nomadic Device Identification and Client Provision for Interaction in a Vehicular Network," IADIS International Conference Wireless Applications and Computing, 2008, pp. 29-37.

Lai et al., "Context-aware Multimedia Streaming Service for Smart Home," The International Conference on Mobile Technology, Applications & Systems 2008 (Mobility Conference), Sep. 10-12, 2008, Ilan, Taiwan.

Kulbak et al., "The eMule Protocol Specification," DANSS Lab, School of Computer Science and Engineering, The Hebrew University of Jerusalem, Jerusalem, Jan. 17, 2005.

Econolite StrongPoint, Mar. 23, 2008. Internet citation downloaded Feb. 19, 2014. http://www.signalcontrol.com/products/econolite/Econolite_StrongPoint.pdf XP 55100983A.

\* cited by examiner

SYSTEM AND METHOD FOR TRAFFIC INFORMATION DELIVERY

This application claims priority to U.S. Provisional Application 61/219,477, which was filed Jun. 23, 2009, and which is fully incorporated herein by reference.

BACKGROUND OF THE INVENTION

1. Field of the Invention

The present invention is directed toward systems for traffic information delivery via an industrial computer network, and related methods.

2. Description of the Related Art

A trend in the transportation industry is to utilize cost-effective communication and networking systems to communicate with traffic controllers located at or near street intersections. The traffic controllers are typically in operative communication with or comprise traffic lights/signals, surveillance cameras, sensors, detectors, etc., one or more of which may be housed in field traffic cabinets at or near the intersections. The communication systems may implement Ethernet and Internet Protocol (IP) based field communications or the like to communicate with and interconnect signalized intersections. An example of a widely utilized control system is a Supervisory Control And Data Acquisition (SCADA) system, which is a computer system for monitoring and controlling one or more processes.

The communications infrastructure associated with such control systems provide the opportunity to effectively relay and deliver traffic information (e.g., updates regarding traffic conditions, collisions at an intersections, etc.) to network devices at or near street intersections. However, the communications infrastructure may be vulnerable to attack or abuse from unauthorized intruders, e.g., "hackers" or insiders operating outside their authority, gaining access to the system using stolen or "cracked" security information or using authorized devices. Accordingly, it would be desirable to provide a cost-effective system and method for relaying and delivering traffic information to mobile and/or static network nodes, while at the same time ensuring the security of communications with such nodes.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a static/mobile network device, and related methods, for delivering information regarding traffic incidents or the like to one or more other network nodes. The network device may include may include a transceiver or communication module (e.g., adapted for wireless communication), at least one processor operatively coupled to the transceiver module, and a memory module operatively coupled to the at least one processor and comprising executable code for the at least one processor.

In one embodiment, the at least one processor of the network device may determine an occurrence of a traffic incident (e.g., a collision at a traffic intersection), and may establish communication with at least one network node (e.g., a mobile node or a static node) within a defined distance from one of the device and the traffic incident. The at least one processor may receive a device identifier over a public network (e.g., public Internet) from the at least one network node. In response to the device identifier matching one of authorized device identifiers corresponding to known network nodes, the at least one processor may establish a secure private network (SPN) with the at least one network node. The network device may send information regarding the traffic incident to the at least one network node via the SPN. For example, the at least one network node may comprise at least one static node and/or at least one mobile node within a second defined distance from one of the network device and the incident. The second defined distance may comprise a radius of a circular coverage area of the network device.

In related aspects, the public network may comprise a wireless communication network. The wireless communication network may implement at least one of CDMA and GSM standards. In the alternative, or in addition, the wireless communication network may implement at least one of 802.11a, 802.11b, 802.11g, 802.11n, and 802.11p (Dedicated Short Range Communications) standards.

In further related aspects, one or more of the techniques and methodologies described herein may be performed by embedded applications, platforms, or systems. For example, the techniques implemented by the static network device described herein may alternatively, or additionally, be performed by applications or components that are embedded in a traffic controller, traffic signal, surveillance cameras, sensors, and/or detectors that are at or near a given traffic intersection. Similarly, the techniques implemented by the network device described herein may alternatively, or additionally, be performed by applications or components that are embedded in vehicles or portable devices that may be carried by vehicle occupants (e.g., mobile phones, digital watches, personal or digital assistants (PDAs)). It is further noted that the methods described herein may be performed by a general-purpose computer system and/or an embedded application or component of a special-purpose system.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The present invention addresses the need for a system and method for providing secured communication and selective utilization of traffic control data from authorized high priority vehicles, such as, for example, first responder or high occupancy vehicles. Such a system preferably shields traffic management systems against denial-of-service (DOS) attacks and address resolution protocol (ARP) redirecting or spoofing originating from malicious code threats. Such a system preferably implements device-based access control to restrict field-control network access only to authorized PCs or devices. Such a system preferably eliminates transportation network vulnerabilities due to unknown security compliance by private network sharers, and makes it possible to monitor and manage field security configuration and status from the TMC.

Such a system may include field security devices that send device identifiers to the TMC in an automated manner, and that establish a secured private network between selected system components based at least in part on whether the device identifier is on the list of authorized device identifiers, thereby determining whether a field security device qualifies as a known device. The device identifiers may be based on a combination of user-configurable and non-user-configurable parameters of the field security device. Such authentication and secured communication techniques may be used alone, or in conjunction with other security or authentication measures.

Figure 1:
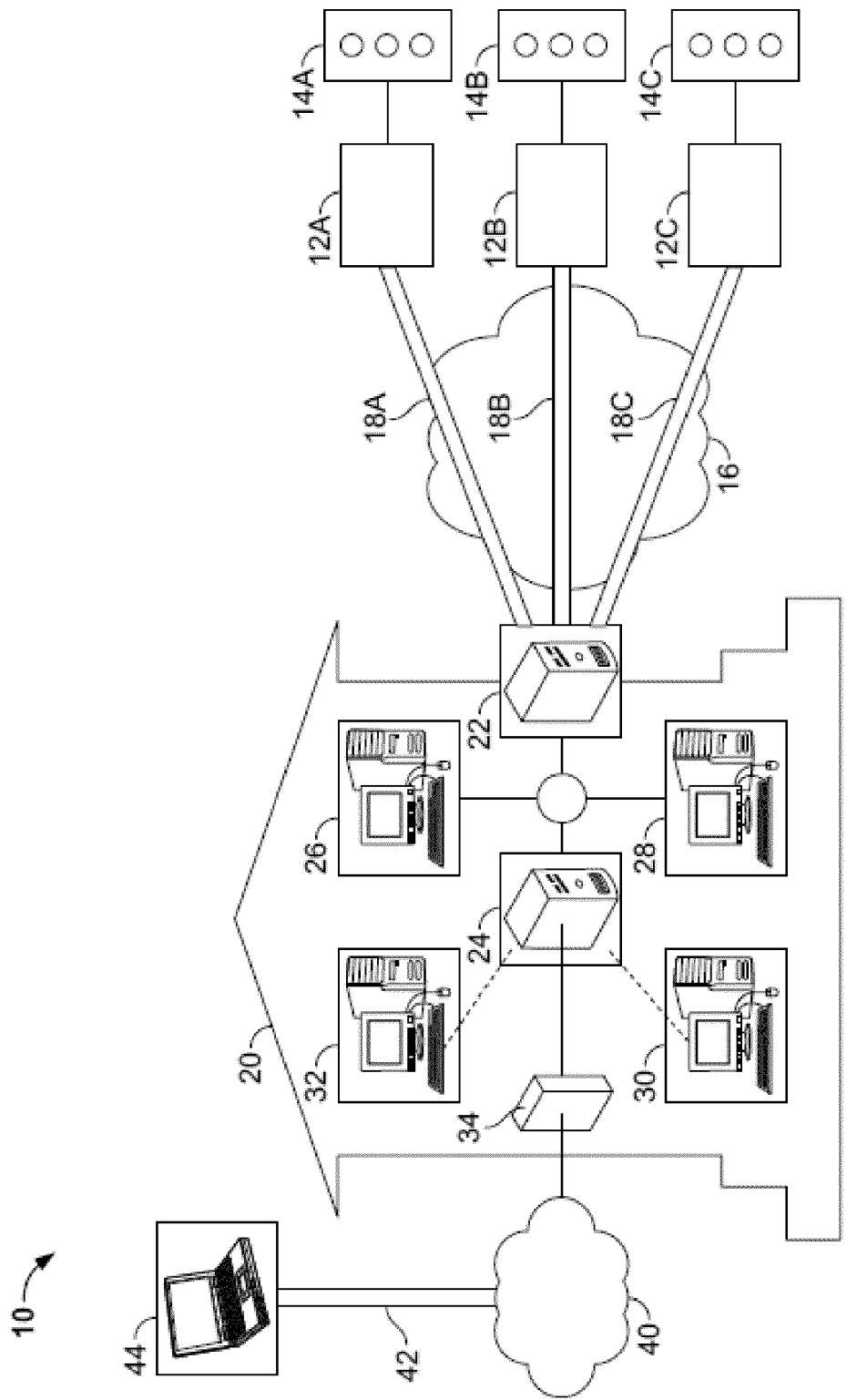
FIG. 1 provides a block diagram of certain components of an exemplary system for secured communication with a traffic management center (TMC).

System for Secured Communication with a Traffic Management Center (TMC):

With reference FIG. 1, there is provided an embodiment of a system 10 for securing communication with a TMC 20. Three traffic controllers 14A, 14B, 14C are shown; however, it will be understood that the system 10 may comprise any number of traffic controllers 14. Each traffic controller 14 may comprise a traffic light or signal, a surveillance camera, detectors, sensors, etc., one or more of which may be housed in a field traffic cabinet. In one embodiment, a traffic controller 14 is operatively coupled to a traffic light.

In the illustrated embodiment, field security devices/apparatuses 12A, 12B, and 12C are operatively coupled to the traffic controllers 14A, 14B, and 14C, respectively. Each field security device 12 may function as a security appliance that creates a secure, virtual-network layer connection between a given traffic controller 14 (coupled to the given field security device 12) and the TMC 20. As will be explained in further detail below, the field security devices 12A, 12B, 12C and authentication server 22 at the TMC 20 utilize device recognition technology to establish secure private networks 18A, 18B, and 18C between the TMC 20 and the field security devices 12A, 12B, and 12C, respectively.

Each secure private network (SPN) 18 may tunnel across one or more segments of a public network 16. The public network 16 (as well as public network 40) may comprise one or more public portions of the Internet (e.g., 802.3, DSL, cable, Ethernet, etc.). The public networks 16, 40 may comprise a wireless communication network, such as, for example, CDMA, GSM, etc. The public networks 16, 40 may comprise a wireless local area network (WLAN), such as, for example, 802.11a, 802.11b, 802.11g, 802.11n, 802.11p (Dedicated Short Range Communications), etc. It is noted that the public networks 16, 40 may comprise any communication network, wired or wireless, utilizing any known standards, such as, for example, wide area networks (WANs), campus area networks (CANs), metropolitan area networks (MANs), wireless application protocol (WAP), etc. In the alternative, or in addition, the SPN 18 may tunnel across a traffic control network, a portion of which is public.

The TMC 20 may include an authentication server 22 that is in operative communication with one or more workstations 26, 28, such as, for example, via a node/switch in between the authentication server 22 and a general server 24 (i.e., not an authentication server). The TMC may include a firewall 34 between the general server 24 and the public network 40, and thereby add another layer of protection for communications to and from the TMC 20. In the alternative, or in addition, the TMC may comprise a firewall (not shown) between the authentication server 22 and the public network 16. In the alternative, or in addition, one or more authentication servers and/or workstations operatively coupled to the authentication servers may be located outside of the TMC, such as, for example, at a remote site.

The system 10 may include a network device 44, such as, for example, laptop computer, tablet computer, PDA, mobile phone or device, etc. The network device 44 may comprise, for example, a field technician's laptop for troubleshooting traffic controllers 14A, 14B, and 14C. Device 44 needs to connect to authentication server 22 in order to establish a SPN 42 between a user of the network device 44 (e.g., a field engineer) and the TMC 20. In one embodiment, the device 44 bypasses the firewall 34 via a VPN soft-server on the server 24. Once the authentication server 22 authorizes device 44, the SPN 42 is established. The SPN 42 may essentially function as a tunnel within the VPN soft-server, and therefore may be analogous to a tunnel within a tunnel. In another embodiment (not shown), a field security device 12 may acts as a proxy for a network device 44 whose user wishes to access the network, when the network device 44 is connected behind the field security device 12.

It is noted that SPN 18 has the ability to provide a star topology whereby the field security devices 12A, 12B, 12C may communicate with each other, through server 22, thereby providing a way for traffic controllers 14A, 14B, and 14C to communicate with each other as well. For example, in one embodiment, SPN 18 may be configured to that field security devices 12A, 12B, 12C can only communicate with server 22 (and workstations 26, 28). Such an embodiment would normally be applicable to an Enterprise Server deployment, thereby preventing a TMC for one city from affecting critical assets of a TMC of another city.

Figure 3:
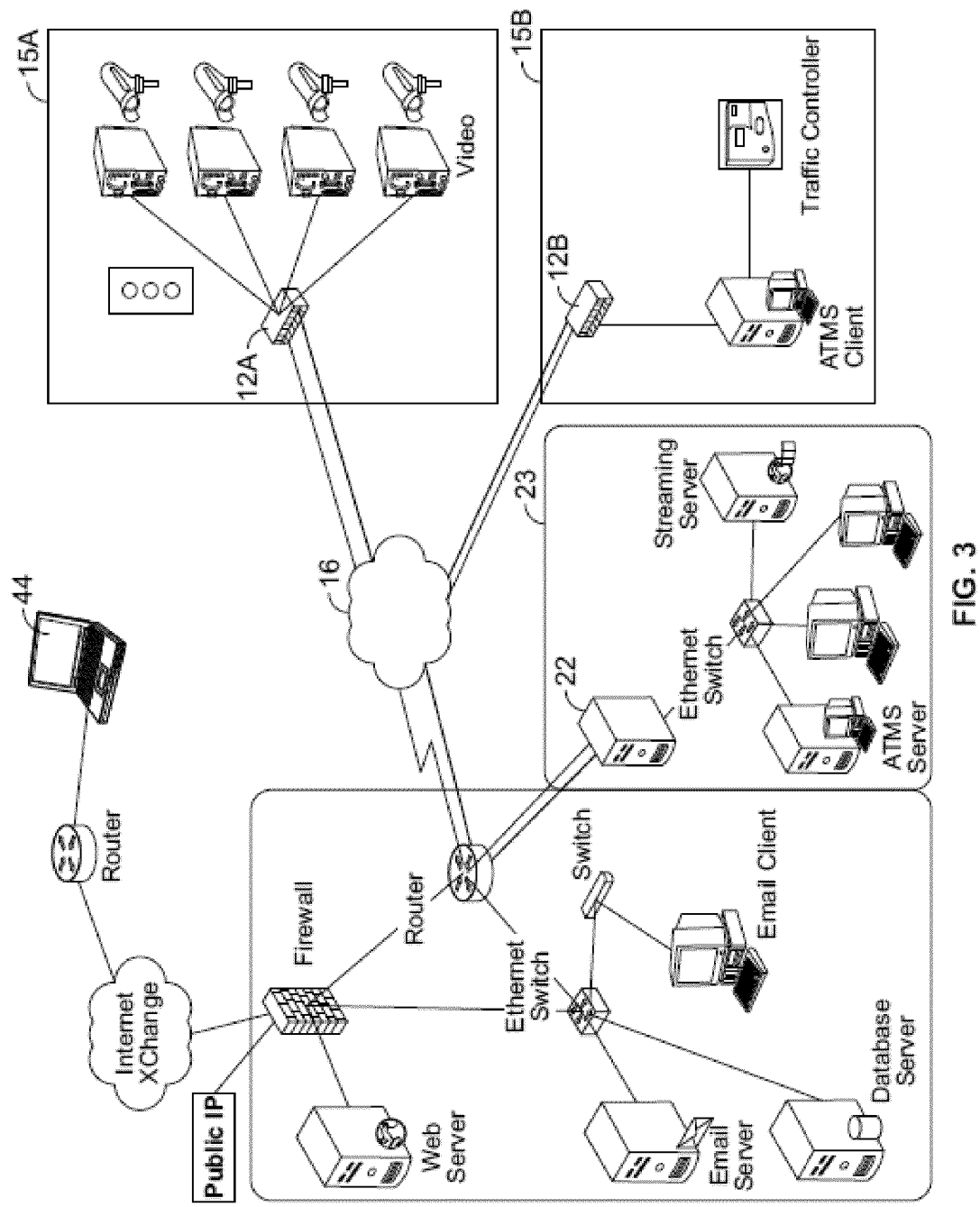
FIG. 3 illustrates an exemplary embodiment of a network for secure communication between field security devices and an authentication server.

FIG. 3 illustrates an exemplary embodiment of a network for securing communication between the field security devices 12A, 12B and the authentication server 22. Portions 15A, 15B, and 23 of the shown network represent the secured portions of the network. Portion 15A may include a field security device 12A in operative communication with a traffic signal/light and/or surveillance/video camera(s). Portion 15B may include a field security device 12B in operative communication with an Advanced Traffic Management Systems (ATMS) client, which is in operative communication with a traffic controller. Portion 23 may include an authentication server 22 in operative communications with other servers, such as, for example, an ATMS server or a streaming server, via an Ethernet switch or the like. The network device 44 (e.g., laptop computer) may also be authenticated via the server 22 for access to the field security devices 12A, 12B.

Device Identifiers:

As noted above, the field security devices 12A, 12B, 12C and the authentication servers 22, 24, as well as the network device 44, may utilize device recognition technology to establish SPNs 18A, 18B, and 18C. For example, each field security device 12 may be adapted to transmit self-identification information to the authentication server 22 upon being powered up in the field. The self-identification information or device identifier generally comprises information that is expected to be unique for the field security device 12. For example, the device identifier for a given field security device 12 may comprise a serial number and/or location information (e.g., an IP address, geo-location code, etc.).

The device identifier is preferably generated from machine parameters of the field security device 12, such as, for example, hard disk volume name, user name, device name, user password, hard disk initialization date, etc. The machine parameters may relate to the platform on which the web browser runs, such as, for example, CPU number, or unique parameters associated with the firmware in use. The machine parameters may also include system configuration information, such as amount of memory, type of processor, software or operating system serial number, etc. The device identifier generated from the machine parameters may include the field security device's IP address and/or other geo-location code to add another layer of specificity to field security device's unique identifier. In the alternative, or in addition, the device identifier may comprise a randomly generated and assigned number that is unique for the field security device 12.

In one embodiment, the device identifier for the field security device 12 is generated and stored in the field security device's memory before the field security device 12 is deployed into the field. In another embodiment, the device identifier, or a portion thereof, is generated after the field security device 12 is deployed and/or powered on in the field.

It is noted that an application running on the field security device 12 or otherwise having access to the field security device's hardware and file system may generate a unique device identifier using a process that operates on data indicative of the field security device's configuration and hardware. The device identifier may be generated using a combination of user-configurable and non-user-configurable machine parameters as input to a process that results in the device identifier, which may be expressed in digital data as a binary number. Each machine parameter may include data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier that has a very high probability of remaining unchanged during normal operation of the target device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same field security device for which the device identifier was first generated. Conversely, each identifier, again to a very high degree of certainty, can be successfully reproduced by the suitably configured application operating or otherwise having access to the same field security device on which the identifier was first generated.

The application may operate by performing a system scan to determine a present configuration of the field security device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 2:
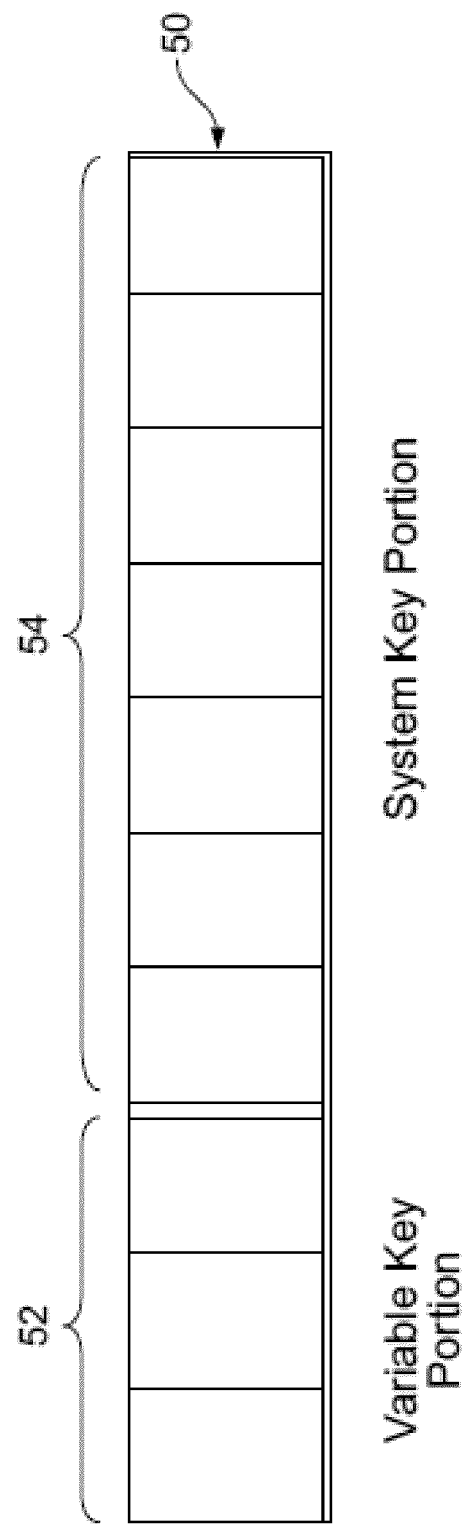
FIG. 2 illustrates components of an exemplary device identifier.

With reference to FIG. 2, in one exemplary embodiment, a device identifier 50 may include two components—namely, a variable key portion 52 and a system key portion 54. The variable key portion 52 may be generated by reference to a variable platform parameter, such as via reference to system time information, although other parameters which are variable may be utilized in other embodiments. The system key portion 54 may include the above described parameters expected to be unique to the field security device 12, such as, for example, hard disk volume name, user name, computer name, user password, hard disk initialization date, or combinations thereof. Portions 52 and/or 54 may be combined with the IP address and/or other platform parameters of the field security device 12. It is noted that device identifiers, or portions thereof, may be encrypted to add an additional layer of specificity and security.

It is noted that device identifiers may be generated for the network device 44, authentication server 22, and workstations 26, 28 in the same manner as described above for the field security devices 12. With reference to the exemplary embodiment of FIG. 1, only server 22, workstations 26 and 28, and laptop 44 have been authenticated.

Secure Private Networks (SPNs):

With continued reference to the exemplary embodiment of FIG. 1, it is noted that each field security device 12 is generally adapted to transmit its device identifier back to the TMC 20. Upon being powered on and/or connected to the traffic controller 14, the field security device 12 preferably accesses an available public network 16, locates or identifies an authentication server 22 at the TMC 20, and then establishes a connection with the authentication server 22. Upon establishing a connection with the authentication server 22, the field security device 12 may transmit its device identifier to the authentication server 22. The device identifier is preferably encrypted prior to being transmitted by the field security device 12 over to the public network 16, and then decrypted when received by the authentication server 22.

In response to receiving the device identifier from a given field security device 12, the authentication server 22 may access a database of authorized device identifiers corresponding to known devices that are authorized to establish a SPN 18 with the TMC 20. The database may be located at the TMC 20, such as, for example, on one of the servers 22, 24 and/or workstations 26, 28, 30, 32. The database is preferably located on server 22 and/or workstations 26, 28. In the alternative, or in addition, the database may be located on a server or machine that is not located at the TMC 20, yet is accessible by server 22.

When the device identifier from the field security device 12 matches one of the authorized device identifiers in the database, the authentication server 22 and the field security device establish a SPN with each other, and thereby create a SPN 18 between the TMC 20 and the traffic controller 14. The SPN 18 generally tunnels across one or more segments of the public network 16 to provide a secure channel of communication between the TMC 20 and the traffic controller 14.

The SPN 18 may be established according to any known technique, such as, for example, via the creation of virtual private networks (VPNs), in which some of the links between nodes are carried by open connections or virtual circuits in a larger network, such as, for example, public portions of the Internet. Link-layer protocols of the virtual network may be tunneled through the larger network.

The field security devices/appliances 12 may get serialized labeling at the manufacturing facility, similar to copies of software for authenticity and tracking/history. For plug-and-play in the field, the appliances may first be connected directly to the authentication server, which may be done at a field tech's offices before initial server deployment, and the IP address of the server may be stored. The device fingerprint may also be taken at this time. The deployment address for each appliance may be entered into the server, such as for use in automated geographic mapping of appliance locations. In the alternative, the appliances 12 may be configured from the field using an authenticated PC connected to the appliance.

It is noted that one or more SPNs 42 may be established between the authentication server 22 and any network devices 44 in the same manner as described above for the field security devices 12. The SPN 42 may tunnel across one or more segments of the public network 42 to provide a secure channel of communication between the TMC 20.

In one embodiment, the field security device 12 sends its device identifier or machine fingerprint to the authentication server 22. When the server 22 verifies that the device identifier corresponds to a known or authorized device, the server sends an authentication/verification signal to the device 12. The device 12 then sends a certificate or public key to the server 22 to establish the SPN 18. The server 22 uses a private key to check the certificate. The server 22 then sends a server certificate or public key back to the device 12 to establish the SPN 18.

Field Security Device:

The field security device 12 may also be referred to as a field appliance and creates a secure, virtual-network layer connection between the TMC 20 over otherwise public communication networks, including or utilizing the Internet, Ethernet, and wireless technologies. The field security device 12 may be operatively coupled to controllers, sensors, detectors, surveillance cameras, uninterruptible power supply (UPS) systems, or other devices supporting an IP or web based user interface.

In accordance with one aspect of the embodiments described herein, there is provided a field security device 12 for providing a SPN 18 between a field traffic controller 14 and a TMC 20, comprising: a first connector for interfacing with the field traffic controller 14; a communication module; a processor module operatively coupled to the first connector and the communication module; and a memory module operatively coupled to the processor module. In one embodiment, the memory module comprises executable code for the processor module to: (a) access a public network 16 or traffic control network via the communication module; (b) locate and/or connect with an authentication server 22 of the TMC 20 via the public network 16; and (c) send a device identifier to the authentication server 22 via the communication module, the device identifier being based on a combination of both user-configurable and non-user-configurable parameters of the field security device 12; and (d) in response to the authentication server 22 authenticating the device identifier from the field security device 12, establish the SPN 18 between the field security device 12 and the TMC 20, wherein the established SPN 18 tunnels across at least one segment of the public network 16.

The processor module of the field security device 12 may comprise one or more processors, such as, for example, a Motorola MPC8321EEC Microprocessor (333 MHz core processor speed, 32 MB flash memory, 64 MB DDR2 memory, 32 Mbs VPN throughput) or the like. The first connector of the field security device 12 may comprise a receiving port or the like (e.g., 1WAN, 4WAN, RJ45, 10/100 Mbit/s Ethernet, etc.).

The field security device 12 is preferably adapted for easy plug-and-play field installation, with no field PC required, no device configuration required in the field, and no passwords or keys required to manage. In essence, when the field security device 12 is connected or powered up, it preferably "phones home" to an authentication server and establishes its own device-locked point-to-point SPN 18.

The memory module of the field security device 12 may further comprise executable code for the processor module to detect network intrusions, determine locations of the intrusions, and notify the TMC 20. The field security device 12 may be adapted to continuously or periodically verify its operational status via one or more authentication servers at the TMC 20. The field security device 12 is preferably cross-platform compatible with any operating system and field control hardware. The field security device 12 is preferably adapted to be NEMA TS2 compliant.

The field security device 12 may be adapted to connect to any known network routers, switches, and/or firewall security devices. The field security device 12 may be adapted to perform a self-test at startup. The field security device 12 may comprise one or more LED indicators to power and communications link status, or activities status.

The field security device 12 may be field hardened for use inside or outside of the field traffic cabinet. The field security device 12 may be shelf mountable for easy in-cabinet placement with optional DIN rail or sidewall mounting. The field security device 12 may be adapted to defined environmental conditions, such as, for example, −29° F. to +165° F. (−34° C. to +74° C.), 0 to 95% relative humidity.

It is noted that the security device/appliance 12 may be adapted to access, learn, or otherwise determine the MAC IDs of traffic controllers 14 or other devices operatively coupled with (e.g., plugged into) the device 12. Further, the device 12 may utilize the learned MAC IDs to establish bi-directional security with such traffic controllers 14, thereby prohibiting unknown/unauthorized network devices from connecting to the secured network via the device 12. For example, the device 12 may comprise a memory module storing executable code for a processor module to access and store into the memory module MAC IDs of those traffic controllers 14 connected to the device 12. The executable code may further comprise instructions for the processor module to relay the MAC ID or derivations thereof to the TMC 20 to verify whether the MAC ID or derivation thereof corresponds to a known or authorized device. In response to the authentication server 22 of the TMC 20 authenticating the MAC ID or derivation thereof, the device 12 may allow the traffic controller 14 to communicate via a SPN 18 between the TMC 20 and the device 12. Otherwise, the traffic controller 14 is blocked or prohibited from communicating with the TMC 20 via SPN 18.

Authentication Server:

In accordance with another aspect of the embodiments described herein, there is provided an authentication server 22 for providing a SPN 18 between a TMC 20 and a field security device 12, the field security device 12 being in operative communication with a field traffic controller 14, comprising: a communication module adapted to receive a device identifier over a public network 16 from the field security device 12, the device identifier being based on a combination of both user-configurable and non-user-configurable parameters of the field security device 12; a processor module operatively coupled to the communication module; and a memory module operatively coupled to the processor module. In one embodiment, the memory module comprises executable code for the processor module to: (a) in response to the communication module receiving the device identifier from the field security device 12, access a database of authorized device identifiers corresponding to known field security devices; and (b) in response to the received device identifier matching one of the authorized device identifiers, establish the SPN 18 between the field security device 12 and the TMC 20, wherein the established SPN 18 tunnels across at least one segment of the public network 16.

When multiple field security devices 12A, 12B, 12C establish SPNs 18A, 18B, 18C with a given authentication server 22, a point-to-multipoint SPN may be established between the TMC 20 with each field traffic cabinet in which the field security devices 12A, 12B, 12C may be located.

The authentication server 22 alone or in conjunction with the workstations 26, 28 and/or other components of the TMC 20, may allocate, manage, and control the field security devices 12 and/or PC clients from a single location, such as, for example, the TMC 20. The TMC 20 and components thereof make it possible to gain real-time insight into the status of the field security devices 12 and network devices 44 (e.g., a PC client or the like) participating in the secured network or system 10.

Further, the components of the system 10 described herein make it possible to define and receive instant status reports and updates regarding any changes to the secured network, and to receive alerts regarding any unauthorized access attempts by unauthorized devices. The notifications or alerts at the server 22 regarding such unauthorized connection attempts may include information regarding the unauthorized device, the time of the attempted access, the geo-location of the unauthorized device or point of attempted access, etc.

In accordance with another aspect of the embodiments described herein, there is provided an enterprise server that may connect or be in operative communication with a plurality of "child" authentication servers. The child authentication servers may be located at multiple TMCs. The master or enterprise server may be adapted to allow authorized field technicians to have access to the multiple TMCs via one enterprise server or service provider. Such technicians may have simultaneous access to the TMCs via the enterprise server. In the alternative, or in addition, each of the authorized technicians may have the ability to simultaneously access one or more of the field security devices that are in operative communicative communication with the TMCs via the enterprise server.

In accordance with yet another aspect of the embodiments described herein, there is provided a system wherein the authentication server 22 sends its own device identifier or machine fingerprint to the field security device 12 for mutual or two-way authentication. In addition to having the server 22 verify and authenticate the device 12's identifier, the device 12 also verifies and authenticates the server 22's identifier, before a SPN 18 is established between the device 12 and the server 22. Such a system would provide a more robust scheme for securing communication with the TMC 20. In the alternative, or in addition, the authentication server 22 may be adapted to sends its device identifier to a network device 44 (explained in further detail below) for mutual authentication between the server 22 and the device 44, without which the SPN 42 may not be established.

Network Device:

In accordance with another aspect of the embodiments described herein, there is provided a network device 44 (e.g., a laptop computer or PDA) for securely communicating with a TMC 20, comprising: a communication module adapted to access a public network; a processor module operatively coupled to the communication module; and a memory module operatively coupled to the processor module. In one embodiment, the memory module comprises executable code for the processor module to: (a) access the public network 40 via the communication module; (b) locate and/or connect with an authentication server 22 of the TMC 20 via the public network 40; (c) send a device identifier to the authentication server 22 via the communication module, the device identifier being based on a combination of both user-configurable and non-user-configurable parameters of the network device 44; and (d) in response to the authentication server 22 authenticating the device identifier from the network device 44, establish a SPN 42 between the network device 44 and the TMC 20, wherein the established SPN 42 tunnels across at least one segment of the public network 40.

The network device 44, as well as the workstations 26, 28, may comprise client software for device fingerprinting and registration on SPNs or the like. It is noted that the network device 44 may comprise a client software that designates the network device 44 as a field technician device, as opposed to TMC workstation devices 26 and 28, which may have licensing provisions that are different from other network devices. The client software on device 44 may comprise instructions for its host network device to: access a public network; locate an authentication server 22 of the TMC 20 via the public network 40; send a device identifier to the authentication server 22, wherein the device identifier is based on a combination of at least one user-configurable parameter and at least one non-user-configurable parameter of the host network device. The client software may further comprise instructions for its host network device to: in response to the authentication server 22 authenticating the device identifier, establish a SPN 42 with the TMC 20, wherein the established SPN 42 tunnels across at least one segment of the public network 40.

Method for Providing a SPN:

In accordance with another aspect of the embodiments described herein, there is provided a method for providing a SPN between a device (e.g., field security device 12 or network device 44) and a TMC, comprising: accessing a public network (e.g., networks 16 or 40); and locating and/or connecting with an authentication server (e.g., server 22) of the TMC via the public network. The method may further comprise sending a device identifier for the device to the authentication server via the communication module, the device identifier being based on a combination of both user-configurable and non-user-configurable parameters of the network appliance. The method may further comprise, in response to the authentication server authenticating the device identifier, establishing the SPN between the TMC and the device. The established SPN preferably tunnels across at least one segment of the public network.

Figure 4:
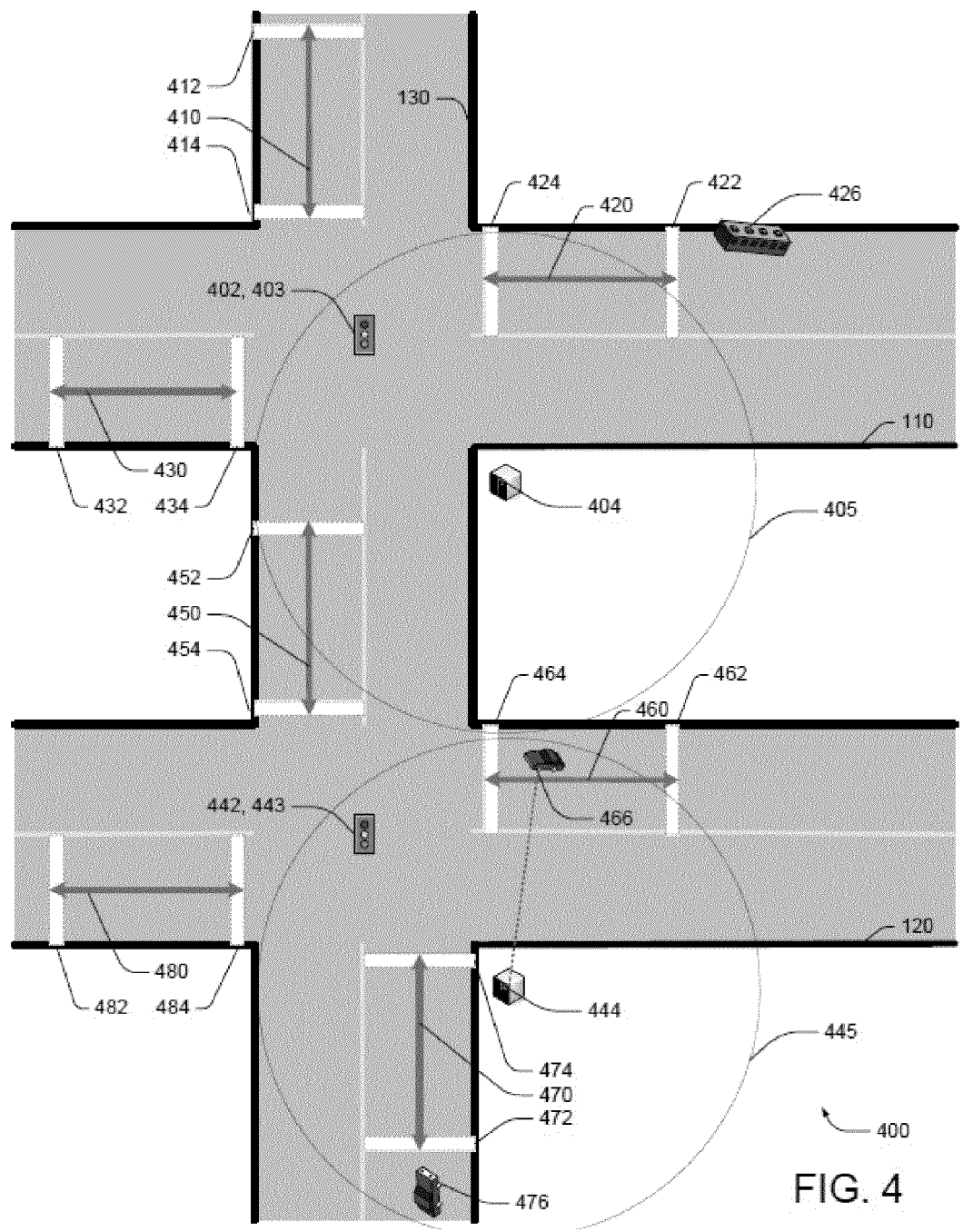
FIG. 4 illustrates an embodiment of a system for traffic information delivery.

Traffic Information Delivery via Network Devices:

With reference to FIG. 4, there are shown traffic intersections 402 and 442 where field security devices may be deployed. Specifically, there is provided a system 400 having two roads 110 and 120 that run approximately parallel to each other, as well as road 130 that intersects and runs approximately perpendicular to roads 110 and 120. At intersection 402, where roads 110 and 130 cross each other, there is a traffic signal 403 that is in operative communication with a traffic cabinet 404. Traffic signal 403 may be connected to and/or housed with a traffic controller (not shown). Traffic signal 403 and the traffic controller may both be placed on a pole or similar structure at intersection 402. Similarly, at intersection 442, where roads 120 and 130 cross each other, there is a traffic signal 443 that is in operative communication with a traffic cabinet 444. For example, traffic signal 443 may be connected to a traffic controller (not shown), both of which may be placed on a pole or the like at intersection 442.

Cabinets 404 and 444 may comprise field security device (s) and may be in operative communication with signals 403 and 443, respectively. As explained above, the traffic controllers may be located with signals 403 and/or 443. Alternatively, the traffic controllers may be located within cabinets 404 and/or 444.

Cabinet 444 may contain a static network device or node (not shown) configured to communicate with vehicles within a defined radius, that defines a perimeter 445. Because vehicles 466 and 476 are within perimeter 445, the static network node in cabinet 444 is able to communicate with vehicles 466 and 476 while these vehicles are located inside in perimeter 445. Similarly, a static network node (not shown)

in cabinet 404 may communicate with vehicles within its perimeter 405. No vehicles are present within perimeter 405 in the illustrative system depicted in FIG. 4. In another embodiment (not illustrated), the static network node may be located outside of the cabinet, such as, for example, with the traffic signal and the traffic controller on the pole.

Vehicle 466 may be a first responder vehicle, a high-occupancy vehicle, or the like, that is approaching intersection 442. Vehicle 466 may have an onboard mobile network device or node that communicates (wireless sly or otherwise) with a static network device inside cabinet 444. The mobile network node in vehicle 466 should typically be within a defined distance or range of the intersection 442 in order to affect the timing of signal 443. For example, when approaching intersection 442 from the east, vehicle 466 should be within range 460, defined by in-range start point 462 and in-range clear point 464. Point 462 is the farthest vehicle 466 may be from the intersection 442 and still communicate with and/or affect the timing of traffic signal 443. Point 464 is the closest vehicle 466 may be to intersection 442 and still communicate with and/or affect the timing of traffic signal 443.

When approaching intersection 442 from the south, a given vehicle should be within range 470, defined by in-range start point 472 and in-range clear point 474, in order to affect the timing of signal 443. Vehicle 476 is outside of range 470 and therefore cannot affect the timing of signal 443. When approaching intersection 442 from the west, a given vehicle should be within range 480, defined by in-range start point 482 and in-range clear point 484. When approaching intersection 442 from the north, a given vehicle should be within range 450, defined by in-range start point 452 and in-range clear point 454.

Similarly, a given vehicle (having a mobile network device for communicating with a static network device in cabinet 404) that approaches intersection 402 should be within defined distance ranges in order to affect the timing of signal 403. When approaching intersection 402 from the north, the vehicle should be within range 410, defined by in-range start point 412 and in-range clear point 414. When approaching intersection 402 from the east, the vehicle should be within range 420, defined by in-range start point 422 and in-range clear point 424. When approaching intersection 402 from the west, the vehicle should be within range 430, defined by in-range start point 432 and in-range clear point 434.

System 400 may also include a command center, such as a traffic management center (not shown) that is in communication, wirelessly or otherwise, with cabinet 404. It is noted that cabinets 404 and 444 may also communicate with each other. It is further noted that the command center may communicate with cabinet 444 via cabinet 404, which may function as a repeater or the like for communications between the command center and cabinet 444.

System 400 may also include a high occupancy vehicle 426 (e.g., a bus) or mobile station that communicates, wirelessly or otherwise, with cabinet 404. The high occupancy vehicle 426 may communicate with cabinet 444 via cabinet 404, which may function as a repeater or the like for communications between vehicle 426 and cabinet 444. In one embodiment, the ability to affect the timing of signals 403 and 443 may be limited to first responder vehicles (e.g., ambulances), high occupancy vehicles, or the like. In the event multiple first responder vehicles are approaching a given intersection, the location and velocity information, as well as priority information, regarding the vehicles are taken into consideration by traffic controller(s) at the given intersection.

With continued reference to FIG. 4, there is provided a static network device in cabinet 444 that may serve traffic information (e.g., traffic alerts, information regarding traffic collisions or accidents, traffic congestions levels, recommended detours or alternative routes, or the like, or combinations thereof) to one or more mobile nodes via a SPN. For example, cabinet 444 may include a static network device that serves or delivers traffic information or related data to mobile nodes on vehicles 466 and/or 476. In the alternative, or in addition, the static network node may receive traffic information from vehicles 466 and/or 476, and may relay such information to other vehicles or other static network devices in other cabinets or the like.

Figure 5:
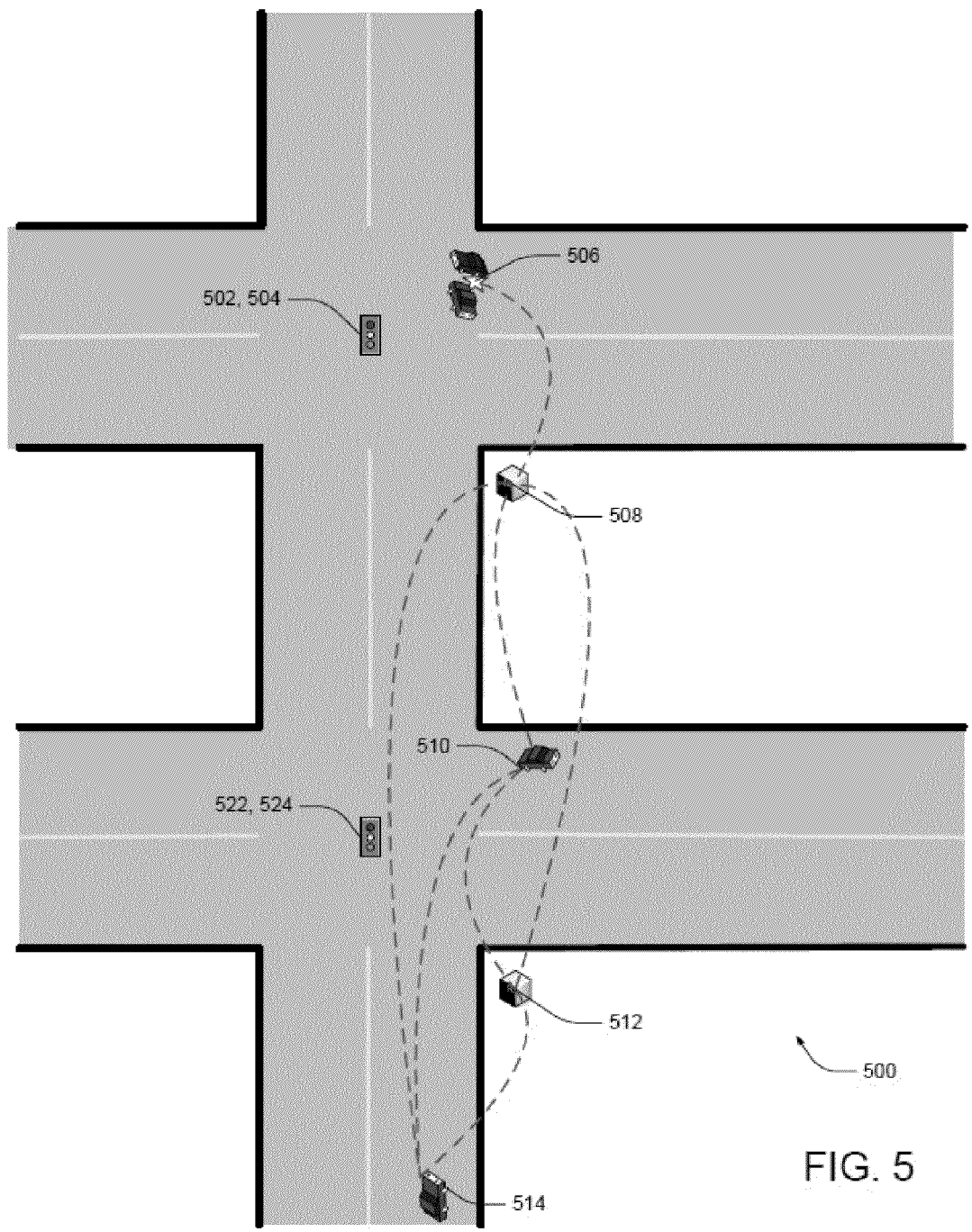
FIG. 5 illustrates another embodiment of a system for traffic information delivery.

With reference to FIG. 5, there is shown a system 500 having traffic intersections 502 and 522 where field security devices may be deployed. At intersection 502, there is a traffic signal 504 that is in operative communication with a traffic cabinet 508. Traffic signal 504 may be connected to and/or housed with a traffic controller (not shown). Traffic signal 504 and the traffic controller may both be placed on a pole or similar structure at intersection 502. Similarly, at intersection 522, there is a traffic signal 524 that is in operative communication with a traffic cabinet 512. For example, traffic signal 524 may be connected to a traffic controller (not shown), both of which may be placed on a pole or the like at intersection 522.

In one embodiment, a static node in cabinet 508 may share, relay, or send traffic information and/or related information to another static node in cabinet 512. The static node in cabinet 508 may send the traffic information, or provide access to such information, to the mobile nodes on vehicles 510 and/or 514. It is noted that vehicles 510 and/or 514 may send vehicle location data (e.g., distance between a given vehicle and a given static node and/or (b) a velocity at which the given vehicle changes its position with respect to given static node), and that the traffic information selected for delivery to vehicles 510 and/or 514 may be based at least in part on the sent vehicle location data.

Similarly, the static node in cabinet 512 may share, relay, or send the traffic information and/or related information to another static node in cabinet 508. The static node in cabinet 512 may send the traffic information, or provide access to such information, to the mobile network nodes on vehicles 510 and/or 514.

With continued reference to FIG. 5, in one embodiment, the traffic information may comprise information regarding a traffic incident, such as, for example, an accident or collision between two cars at intersection 502. The static node in cabinet 508 may send this traffic information to one or more of cabinet 512, vehicle 510, and/or vehicle 514. In addition, the static node in cabinet 508 may send the traffic information, wirelessly or otherwise, to a TMC or the like. In the alternative, or in addition, one or more of another static node in cabinet 512 and mobile nodes in vehicles 510 and/or 514 may send the traffic information to the TMC. Is further noted that one or more of the static and mobile nodes described herein may be in operative communication with and send traffic information to a emergency dispatcher, medical services personnel, law enforcement, etc.

In accordance with aspects of the embodiments described herein, the static network device in cabinet 508 and/or 512 may include a transceiver or communication module adapted to receive, wireles sly or otherwise, a device identifier over a public network (e.g., the public Internet) from the at least one mobile node. The device identifier may be based on a combination of at least one user-configurable parameter and at least one non-user-configurable parameter of the at least one mobile node. It is noted that the static network device may be housed in an infrastructure cabinet, such as a field traffic cabinet or the like. The at least one mobile node may be located in a first responder vehicle (e.g., an ambulance), a passenger vehicle, a mass transit vehicle, etc. The static network device may further include at least one processor operatively coupled to the transceiver module, as well as a memory module operatively coupled to the at least one processor and comprising executable code for the at least one processor.

In one embodiment, the at least one processor of the static network device may: determine an occurrence of a traffic incident (e.g., a collision at an intersection) within a defined distance from the device; establish communication with at least one network node (e.g., a mobile node or a static node); and receive a device identifier over a public network from the at least one network node. The device identifier may be based on a combination of at least one user-configurable parameter and at least one non-user-configurable parameter of the at least one network node. The at least one processor may, in response to the device identifier matching one of authorized device identifiers corresponding to known network nodes, establish a SPN with the mobile node. The at least one processor may send information regarding the traffic incident to the at least one network node via the SPN.

In related aspects, the at least one network node may comprise a plurality of static nodes within a second defined distance from one of the device and the incident. The second defined distance comprises a radius of a circular coverage area of the device. In the alternative, or in addition, the at least one network node may comprise a plurality of mobile nodes within a second defined distance from one of the device and the incident.

In accordance with aspects of the embodiments described herein, the mobile network device on vehicle 510 and/or 514 may include a transceiver or communication module (e.g., adapted for wireless communication), at least one processor operatively coupled to the transceiver module, and a memory module operatively coupled to the at least one processor and comprising executable code for the at least one processor. The mobile network device may be located on a passenger vehicle, bus, train, tram, monorail, or the like. For example, the mobile network device may be embedded a vehicle or an electronic component thereof. In the alternative, the mobile network device may comprise a portable device carried by a vehicle occupant or stored in the vehicle.

In one embodiment, the at least one processor of the mobile network device may determine an occurrence of a traffic incident, and may establish communication with at least one network node (e.g., a mobile node or a static node) within a defined distance from one of the device and the traffic incident. The at least one processor may receive a device identifier over a public network (e.g., public Internet) from the at least one network node. In response to the device identifier matching one of authorized device identifiers corresponding to known network nodes, the at least one processor may establish a SPN with the mobile node. The mobile network device may send information regarding the traffic incident to the at least one network node via the SPN. For example, the at least one network node may comprise at least one static node and/or at least one mobile node within a second defined distance from one of the device and the incident. The second defined distance may comprise a radius of a circular coverage area of the device.

In related aspects, the device identifier may be based on a combination of at least one user-configurable parameter and at least one non-user configurable parameter of a given network node. The at least one non-user-configurable parameter may comprise at least one of CPU ID, CPU model, CPU manufacturer, and CPU voltage for the given network node.

The at least one non-user-configurable parameter may be based on a carbon degradation characteristic of a computer chip of the given network node. The at least one non-user-configurable parameter may be based on a silicone degradation characteristic of a computer chip of the given network node. The at least one user-configurable parameter may comprise one of hard disk volume name, user name, device name, user password, and hard disk initialization date for the given network node.

In further related aspects, the device identifier may be generated by utilizing at least one irreversible transformation (e.g., cryptographic hash function) of the at least one user-configurable parameter and/or the at least one non-user-configurable parameter of the given network node or components thereof.

Figure 6:
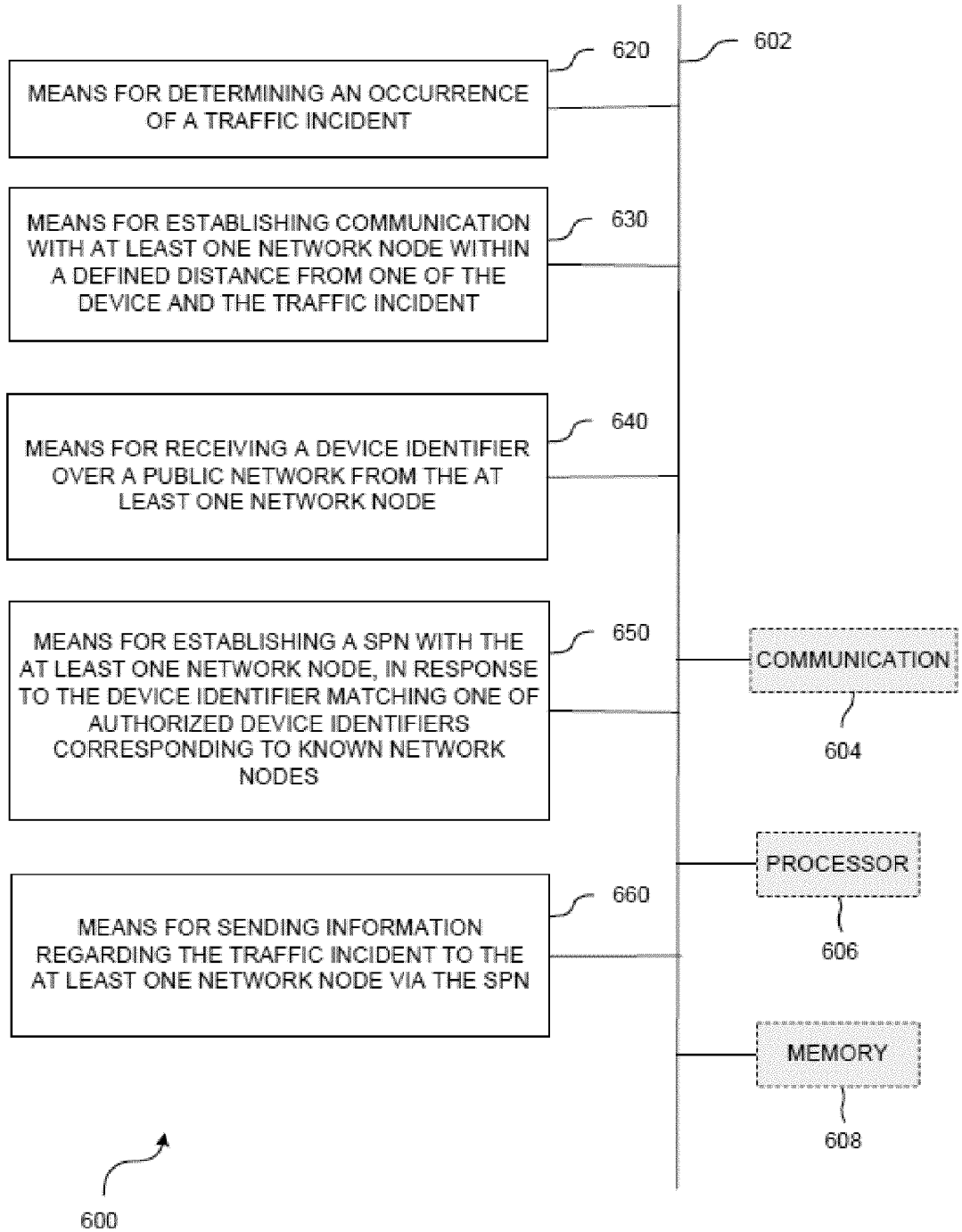
FIG. 6 illustrates one embodiment of a network device for traffic information delivery.

In accordance with one or more aspects of the embodiments described herein, there are provided devices and apparatuses (e.g., static or mobile network devices) for sharing traffic information with other network devices/nodes. With reference to FIG. 6, there is provided an exemplary apparatus 600 that may be configured as either a computing device, or as a processor or similar device for use within a computing device. As illustrated, apparatus 600 may comprise a means 620 for determining an occurrence of a traffic incident, and a means 630 for establishing communication with at least one network node within a defined distance from one of the device and the traffic incident.

Apparatus 600 may comprise a means 640 for receiving a device identifier over a public network from the at least one network node, the device identifier being based on a combination of at least one user-configurable parameter and at least one non-user-configurable parameter of the at least one network node. Apparatus 600 may comprise a means 650 for establishing a SPN with the at least one network node, in response to the device identifier matching one of authorized device identifiers corresponding to known network nodes. Further, apparatus 600 may comprise a means 660 for sending information regarding the traffic incident to the at least one network node via the SPN.

Apparatus 600 may optionally include a processor module 606 having at least one processor, in the case of apparatus 600 configured as computing device, rather than as a processor. Processor 606, in such case, may be in operative communication with means 620-660, and components thereof, via a bus 602 or similar communication coupling. Processor 606 may effect initiation and scheduling of the processes or functions performed by means 620-660, and components thereof.

Apparatus 600 may include a transceiver/communication module 604 for communicating with mobile nodes and/or other static nodes. A stand alone receiver and/or stand alone transmitter may be used in lieu of or in conjunction with communication module 604.

Apparatus 600 may optionally include a means for storing information, such as, for example, a memory device/module 608. Computer readable medium or memory device/module 608 may be operatively coupled to the other components of apparatus 600 via bus 602 or the like. The computer readable medium or memory device 608 may be adapted to store computer readable instructions and data for effecting the processes and behavior of means 620-660, and components thereof, or processor 606 (in the case of apparatus 600 configured as a computing device) or the methods disclosed herein.

In related aspects, the memory module 608 may optionally include executable code for the processor module 606 to selectively receive/use information from at least one mobile node by: (a) determining an occurrence of a traffic incident;

(b) establishing communication with at least one network node (e.g., a static node or a mobile node) within a defined distance from one of the device and the traffic incident; (c) receiving a device identifier over a public network from the at least one network node, the device identifier being based on a combination of at least one user-configurable parameter and at least one non-user-configurable parameter of the at least one network node; (d) in response to the device identifier matching one of authorized device identifiers corresponding to known network nodes, establishing a secure private network (SPN) with the at least one network node; and (e) sending information regarding the traffic incident to the at least one network node via the SPN. One or more of steps (a)-(e) may be performed by processor module 606 in lieu of or in conjunction with the means 620-660 described above.

Embedded Systems and Applications:

As noted above, one or more of the techniques and methodologies described herein may be performed by embedded applications, platforms, or systems. The methods described herein may be performed by a general-purpose computer system and/or an embedded application or component of a special-purpose apparatus (e.g., traffic controller, traffic signal, surveillance cameras, sensors, detectors, vehicles, vehicle navigation systems, mobile phones, PDAs, etc.).

In one embodiment, the special-purpose device comprises an embedded platform running an embedded Linux operating system (OS) or the like. For example, the unique device identifier or fingerprint for the special-purpose device may be created by collecting and using one or more of the following information: machine model; processor model; processor details; processor speed; memory model; memory total; network model of each Ethernet interface; network MAC address of each Ethernet interface; BlackBox model (e.g., any Flash device); BlackBox serial (e.g., using Dallas Silicone Serial DS-2401 chipset or the like); OS install date; nonce value; nonce time of day; and any other predefined hardware information stored (optionally encrypted) in EEPROM; any variations/combinations thereof.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A network device for sharing information with network nodes, comprising:
  a stationary transceiver module;
  at least one processor operatively coupled to the stationary transceiver module; and
  a memory module operatively coupled to the at least one processor and comprising executable code for the at least one processor to:
    determine an occurrence of a traffic incident within a defined distance from the device;
    establish communication with at least one network node;
    receive a device identifier over a public network from the at least one network node, the device identifier being based on a combination of at least one user-configurable parameter and at least one non-user-configurable parameter of the at least one network node;
    establish, in response to the device identifier matching one of authorized device identifiers corresponding to known network nodes, a secure private network (SPN) with the at least one network node; and send information regarding the traffic incident to the at least one network node via the SPN.

2. The device of claim 1, wherein the traffic incident comprises a collision at an intersection.

3. The device of claim 1, wherein the at least one network node comprises a mobile node.

4. The device of claim 3, wherein the mobile node is located on one of a passenger vehicle and a first responder vehicle.

5. The device of claim 1, wherein the at least one network node comprises a static node.

6. The device of claim 1, wherein the at least one network node comprises a plurality of static nodes within a second defined distance from one of the device and the incident.

7. The device of claim 6, wherein the second defined distance comprises a radius of a circular coverage area of the device.

8. The device of claim 1, wherein the transceiver module is adapted for wireless communication.

9. The device of claim 1, wherein the public network comprises the public Internet.

10. A mobile network device, for sharing information with network nodes, comprising:
   a transceiver module;
   at least one processor operatively coupled to the transceiver module; and
   a memory module operatively coupled to the at least one processor and comprising executable code for the at least one processor to:
      determine an occurrence of a traffic incident;
      establish communication with at least one network node within a defined distance from one of the device and the traffic incident;
      receive a device identifier over a public network from the at least one network node, the device identifier being based on a combination of at least one user-configurable parameter and at least one non-user-configurable parameter of the at least one network node;
      establish, in response to the device identifier matching one of authorized device identifiers corresponding to known network nodes, a secure private network (SPN) with the at least one network node; and
      send information regarding the traffic incident to the at least one network node via the SPN.

11. The method of claim 10, wherein the traffic incident comprises a collision at an intersection.

12. The method of claim 10, wherein the at least one network node comprises a mobile node.

13. The method of claim 10, wherein the at least one network node comprises a static node.

14. The method of claim 13, wherein the static node is housed in an infrastructure cabinet.

15. The method of claim 14, wherein the infrastructure cabinet comprises a field traffic cabinet.

16. The method of claim 10, wherein the at least one network node comprises a plurality of static nodes within a second defined distance from one of the device and the incident.

17. The method of claim 10, wherein the second defined distance comprises a radius of a circular coverage area of the device.

18. The method of claim 10, wherein the transceiver module is adapted for wireless communication.

19. The method of claim 10, wherein the public network comprises the public Internet.

20. A method for sharing information with network nodes, comprising:
   determining an occurrence of a traffic incident;
   establishing communication with at least one network node within a defined distance from one of the device and the traffic incident;
   receiving a device identifier over a public network from the at least one network node, the device identifier being based on a combination of at least one user-configurable parameter and at least one non-user-configurable parameter of the at least one network node;
   establishing, in response to the device identifier matching one of authorized device identifiers corresponding to known network nodes, a secure private network (SPN) with the at least one network node; and
   sending information regarding the traffic incident to the at least one network node via the SPN.

* * * * *